(12) United States Patent
Bonilla

(10) Patent No.: US 11,664,665 B2
(45) Date of Patent: *May 30, 2023

(54) SYSTEM AND METHOD FOR POWER DISTRIBUTION

(71) Applicant: Hubbell Incorporated, Shelton, CT (US)

(72) Inventor: Nelson Bonilla, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,793

(22) Filed: Jun. 2, 2022

(65) Prior Publication Data

US 2022/0294233 A1    Sep. 15, 2022

Related U.S. Application Data

(63) Continuation of application No. 15/912,870, filed on Mar. 6, 2018, now Pat. No. 11,387,658.

(60) Provisional application No. 62/467,432, filed on Mar. 6, 2017.

(51) Int. Cl.
  *H02J 4/00* (2006.01)
  *G06F 1/26* (2006.01)
  *H02J 50/10* (2016.01)

(52) U.S. Cl.
  CPC ............... *H02J 4/00* (2013.01); *G06F 1/26* (2013.01); *H02J 50/10* (2016.02)

(58) Field of Classification Search
  CPC .... H02J 4/00; H02J 5/005; H02J 50/10; H02J 2310/12; G06F 1/26
  See application file for complete search history.

(56) References Cited

U.S. PATENT DOCUMENTS 4,285,023 A * 8/1981 Kalivas ............... G05F 1/38
                                                340/645
5,894,392 A    4/1999 McDonald
6,753,622 B2   6/2004 Oughton, Jr.
(Continued)

FOREIGN PATENT DOCUMENTS

CN    202282534 U  *  6/2012
CN    202282534 U     6/2012

OTHER PUBLICATIONS

PCT/US2018/021030 International Search Report and Written Opinion dated May 10, 2018 (12 pages).

(Continued)

*Primary Examiner* — Pinping Sun
(74) *Attorney, Agent, or Firm* — Robinson & Cole LLP

(57) ABSTRACT

A power distribution system including a first power module and a second power module. The first power module including a first rectifier receiving an input power and outputting a rectified power, and a first power output configured to output the input power. The first power module further including a second power output configured to output the rectified power and a pass-through output configured to output input power. The second power module including a second rectifier receiving the input power and outputting a second rectified power, a third power output configured to output the input power, and a fourth power output configured to output the second rectified power.

16 Claims, 4 Drawing Sheets

(56) References Cited

U.S. PATENT DOCUMENTS

| | | | |
|---|---|---|---|
| 6,857,896 B2 | 2/2005 | Rupert et al. | |
| 7,057,108 B1 | 6/2006 | Sodemann et al. | |
| 7,358,625 B2 | 4/2008 | Cheng et al. | |
| 7,426,126 B1* | 9/2008 | Lai | H02J 7/00308 363/146 |
| 7,607,928 B2 | 10/2009 | Schriefer et al. | |
| 8,033,867 B1 | 10/2011 | Kessler et al. | |
| 8,350,406 B2 | 1/2013 | Byrne et al. | |
| 8,373,958 B2 | 2/2013 | Yeo | |
| 8,971,083 B1 | 3/2015 | Johnson | |
| 9,652,014 B2 | 5/2017 | Warwick et al. | |
| 11,387,658 B2* | 7/2022 | Bonilla | H02J 50/10 |
| 2006/0087872 A1* | 4/2006 | Barsun | G06F 1/26 363/146 |
| 2007/0258202 A1 | 11/2007 | Cooley et al. | |
| 2010/0079001 A1 | 4/2010 | Lee et al. | |
| 2010/0296326 A1* | 11/2010 | Unger | H02M 7/003 363/146 |
| 2011/0088941 A1 | 4/2011 | Ty et al. | |
| 2012/0295483 A1* | 11/2012 | Smed | H01R 24/76 439/620.21 |
| 2013/0015714 A1 | 1/2013 | Kwok | |
| 2013/0119772 A1* | 5/2013 | Byrne | H02J 3/00 307/99 |
| 2013/0313896 A1 | 11/2013 | Gless et al. | |
| 2014/0054966 A1 | 2/2014 | Jain | |
| 2014/0055080 A1* | 2/2014 | Ishikura | B60L 50/20 320/103 |
| 2014/0077607 A1 | 3/2014 | Clark et al. | |
| 2014/0268937 A1* | 9/2014 | Krishnamoorthy | H02M 7/2176 363/49 |
| 2015/0108833 A1 | 4/2015 | Ito et al. | |
| 2015/0162157 A1 | 6/2015 | Luebke et al. | |
| 2015/0261231 A1 | 9/2015 | Jiang et al. | |
| 2017/0041152 A1* | 2/2017 | Sheffield | H04B 3/56 |
| 2018/0131283 A1* | 5/2018 | Ono | H02M 3/285 |
| 2018/0248404 A1 | 8/2018 | Pinewski et al. | |
| 2018/0351360 A1 | 12/2018 | Pinewski et al. | |

OTHER PUBLICATIONS

Chinese Patent Application No. 2018800202442.2 Second Office Action issued by the China National Intellectual Property Administration (and translation) dated Jul. 22, 2021.
Office Action issued in Chinese Patent Application No. 201880020244.2 dated Mar. 24, 2022 (8 pages).

* cited by examiner

SYSTEM AND METHOD FOR POWER DISTRIBUTION

This application claims priority to U.S. patent application Ser. No. 15/912,870, filed Mar. 6, 2018, which claims priority to U.S. Provisional Patent Application No. 62/467,432, filed Mar. 6, 2017, the entire contents of all of which are hereby incorporated by reference.

FIELD

Embodiments relate to power distribution systems.

SUMMARY

Power distribution systems, such as a power strip or a multiple outlet device, may include one or more electrical sockets. The power strip, or multiple outlet device, may include an input and one or more outputs, each having a similar power. However, users may require inputs and outputs configured to receive and output different powers.

Thus, one embodiment provides a power distribution system including a first power module and a second power module. The first power module including a first power input receiving an input power, a first rectifier receiving the input power and outputting a rectified power, and a first power output configured to output the input power. The first power module further including a second power output configured to output the rectified power, a pass-through output configured to output input power, and a first circuit breaker configured to provide overcurrent protection before the input power is received by the first rectifier and the first power output. The second power module including a second power input receiving the input power, from the pass-through output of the first power module, a second rectifier receiving the input power and outputting a second rectified power, and a third power output configured to output the input power. The second power module further including a fourth power output configured to output the second rectified power, and a second circuit breaker configured to provide overcurrent protection before the input power is received by the second rectifier and the third power output and provide overcurrent protection after the input power is output from the pass-through output.

Another embodiment provides a method of distributing power. The method including receiving, via an input power, an input power, rectifying, via a first rectifier, the input power into a rectified power, and outputting, via a first power output, the input power. The method further including outputting, via a second power output, the rectified power, outputting, via a pass-through output, the input power, and providing, via a first circuit breaker within a first housing of a first power module, overcurrent protection before the input power is received by the first rectifier and the first power output. The method further including receiving, via a second power input, the input power from the pass-through output, rectifying, via a second rectifier, the input power from third power input into a second rectified power, and outputting, via a third power output, the input power from the third power input. The method further including outputting, via a fourth power output, the rectified power from the second rectifier, and providing, via a second circuit breaker within a second housing of a second power module, overcurrent protection before the input power is received by the second transformer and the third power output and provide overcurrent protection after the input power is output from the pass-through output.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
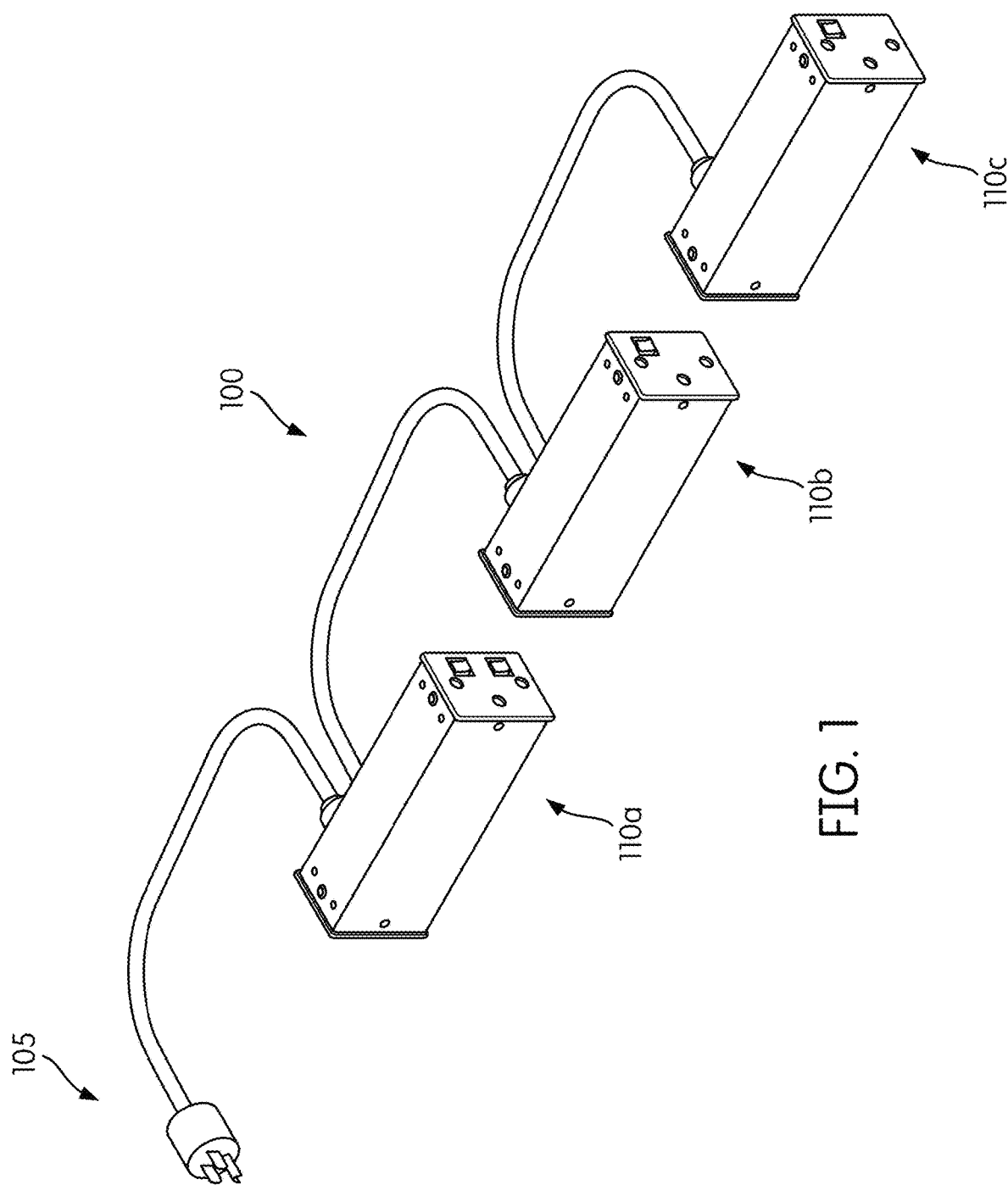
FIG. 1 illustrates a power distribution system according to some embodiments.

FIG. 1 illustrates a power distribution system 100 according to some embodiments. The power distribution system 100 includes a power input 105 and one or more power modules 110 (for example, power modules 110a, 110b, 110c). The power input 105 is configured to receive an input power. In the illustrated embodiment, the power input 105 is a power plug configured to receive the input power from an electrical socket. In some embodiments, the input power is approximately 110 VAC to approximately 120 VAC. In other embodiments, the input power is approximately 210 VAC to approximately 220 VAC.

Figure 2:
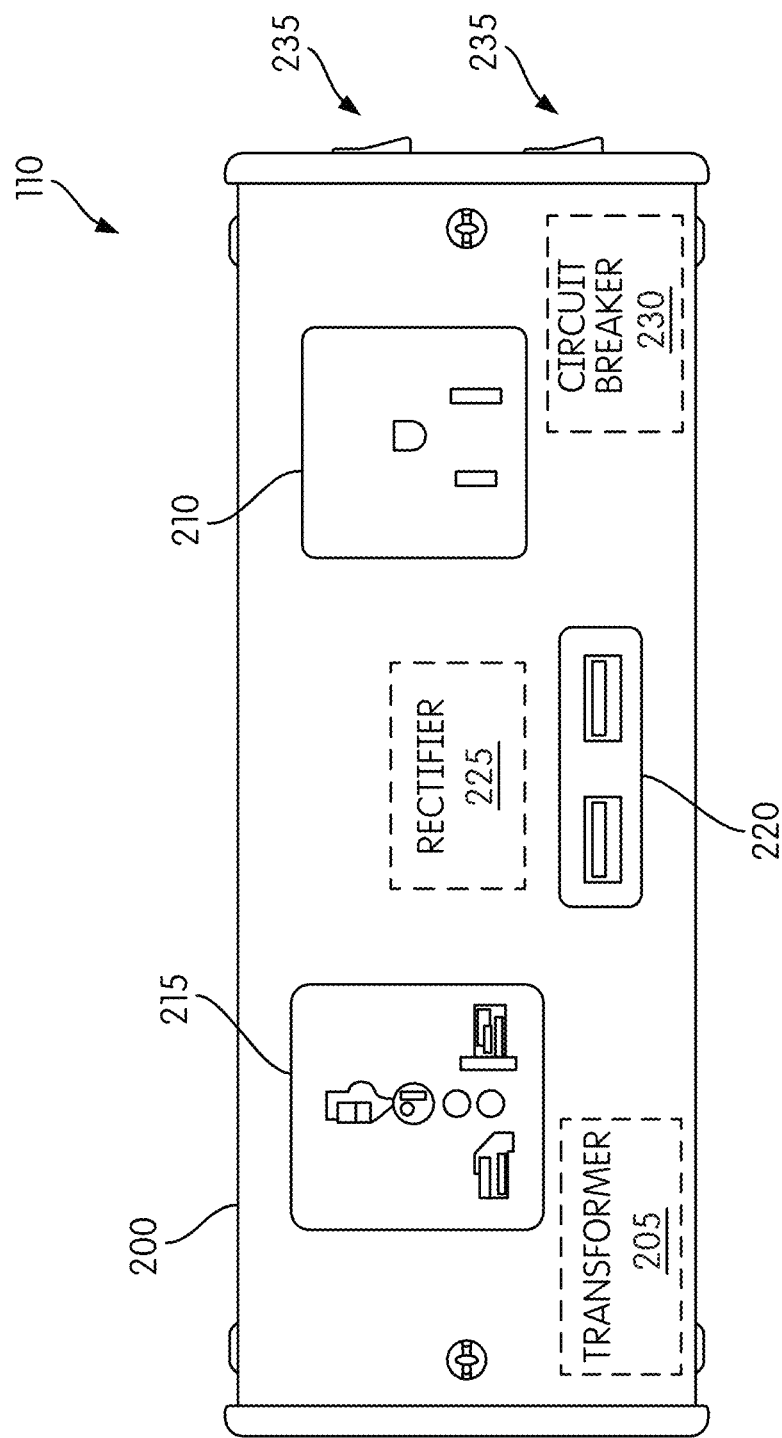
FIG. 2 illustrates a front view of a power module of the power distribution system of FIG. 1 according to some embodiments.
Figure 3:
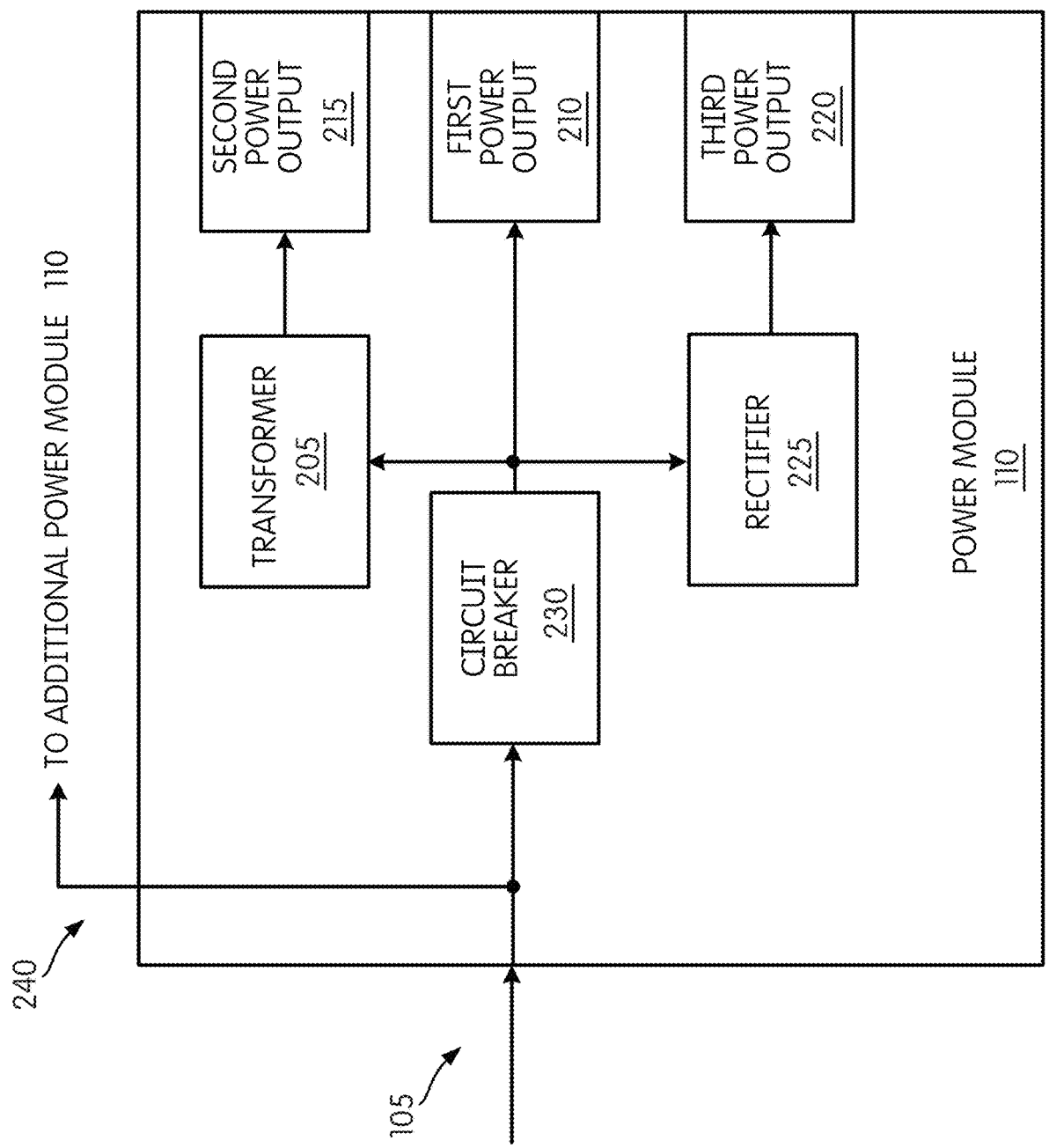
FIG. 3 illustrates a block diagram of the power module of FIG. 2 according to some embodiments.

FIGS. 2 and 3 illustrate a power module 110 according to some embodiments. The power module 110 includes a power module housing 200, a transformer 205, a first power output 210, and a second power output 215. In some embodiments, the power module 110 may further include a third power output 220 and a circuit breaker 225.

The transformer 205 is configured to transform the input power to a transformed power. In some embodiments, the transformer 205 is a step up & down transformer. In such an embodiment, the transformer 205 is configured to receive an input power of approximately 120 VAC and output a transformed power of approximately 220 VAC. Additionally, in such an embodiment, the transformer 205 is configured to receive an input power of approximately 220 VAC and output a transformed power of approximately 120 VAC.

In some embodiments, such as the one illustrated, the transformer 205 is located within the power module housing 200. However, in other embodiments, the transformer 205 may be located outside the power module housing 200 and includes its own transformer housing.

In some embodiments, the power outputs 210, 215, 220 are power receptacles configured to receive a power plug. In some embodiments, power outputs 210, 215, 220 are similar power receptacles configured to output similar power, while in other embodiments, power outputs 210, 215, 220 are different power receptacles configured to output power having different characteristics (for example, different voltage amplitudes and/or magnitudes, different voltage frequencies, alternating current, or direct current). In the illustrated embodiments, the first power output 210 is a European power receptacle configured to output power having approximately 220 VAC, the second power output 215 is a North American power receptacle configured to output power having approximately 120 VAC, and the third power output 220 is a Universal Serial Bus (USB) power output configured to output approximately 5 VDC. However, in other embodiments, the outputs 210, 215, and 220 may be different.

In embodiments including a USB power output, such as the one illustrated, the power module 110 further includes a rectifier 225, or other converter. The rectifier 225 may be configured to receive the input power, rectify the input power from AC to DC, and output the rectified DC power. In the illustrated embodiment, the rectifier 225 outputs the rectified DC power to the third power output 220.

Circuit breaker 230 is configured to provide overcurrent protection to the power module 110. In operation, the circuit breaker 230 senses an overcurrent condition (for example, from an overload or short circuit) and interrupts current flow to power outputs 210, 215, 220 upon sensing the overload condition. In such an embodiment, the power module 110 may further include one or more user-interfaces 235 for operating the circuit breaker 230. For example, the user-interfaces 235 may be a RESET button and a TEST button.

In embodiments having two or more power modules 110 electrically coupled together, a first power module (for example, power module 110*a* (FIG. 1)) includes a pass-through output 240. The pass-through output 240 passes through, and outputs, the input voltage to an additional power module (for example, power module 110*b* (FIG. 1)). In such an embodiment, power module 110*b* (FIG. 1) may also include a pass-through output 240 to pass through, and output, the input voltage to power module 110*c*.

Figure 4:
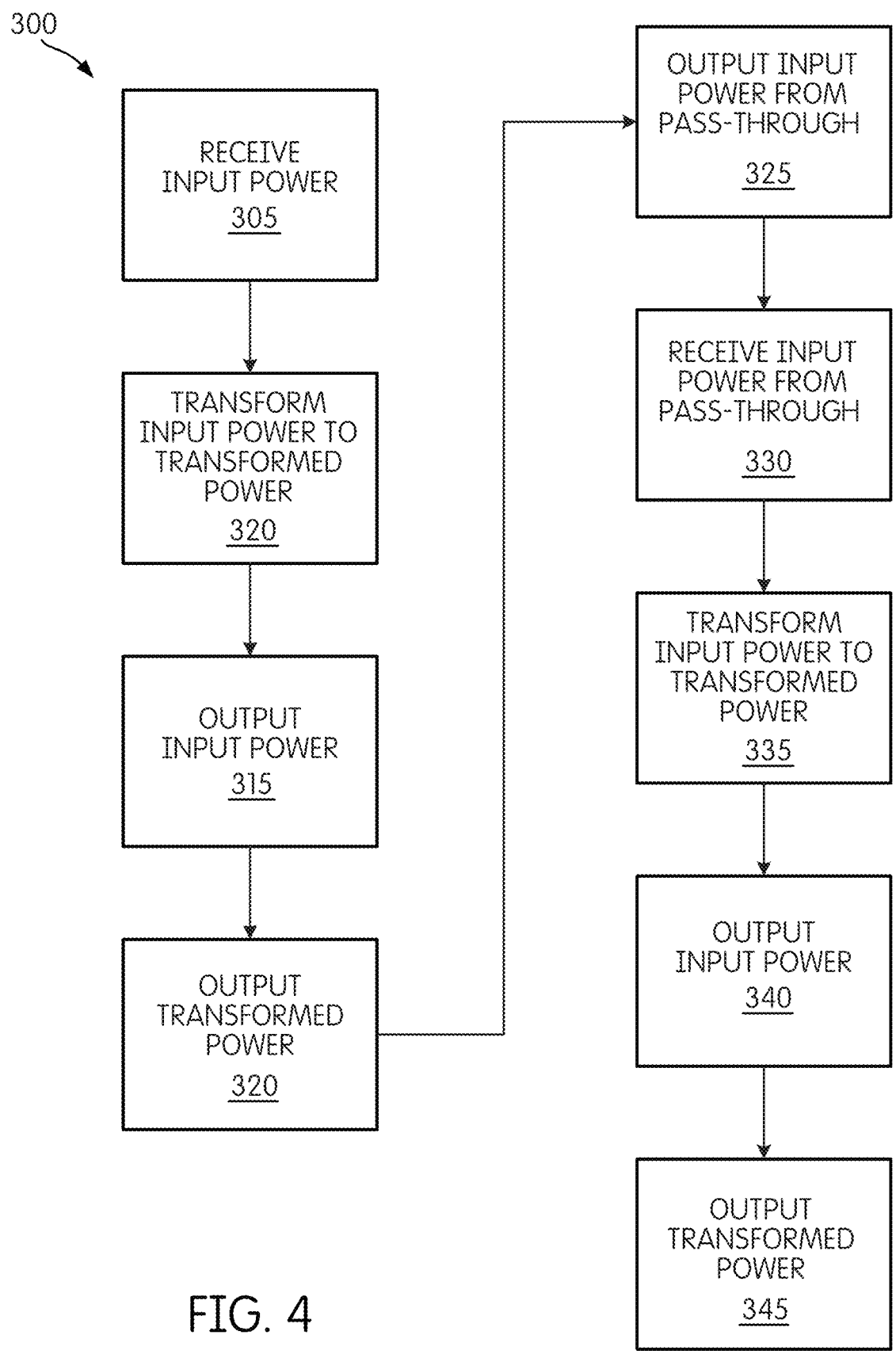
FIG. 4 is a flow chart illustrating a process, or operation, of the power distribution system of FIG. 1 according to some embodiments.

FIG. 4 illustrates a process, or operation, 300 of the power distribution system 100 according to some embodiments. It should be understood that the order of the steps disclosed in process 300 could vary. Although illustrated as occurring in parallel order, in other embodiments, the steps disclosed may be performed in serial order. Furthermore, additional steps may be added to the process and not all of the steps may be required.

The input power is received via the input power 105 of a first power module 110 (for example, power module 110*a* of FIG. 1) (block 305). The power is transformed to a transformed power via a transformer 205 (block 310). The input power is then output via the first power output 210 (block 315). The transformed power is then output via the second power output 210 (block 320). The input power is also output via the pass-through output 240 (block 325).

The input power output via the pass-through output 240 is then received by a second power module 110 (for example, power module 110*b* of FIG. 1) (block 330). The input power received by the second power module 110 is transformed into a transformed power (block 335). The input power received by the second power module 110 is then output via the first power output 210 of the second power module 110 (block 340). The transformed power is then output via the second power output 210 of the second power module 110 (block 345).

Thus, the application provides, among other things, a system and method for distributing power. Various features and advantages of the application are set forth in the following claims.

What is claimed is:

1. A power distribution system comprising:
    a first power module including
        a first power input receiving an input power,
        a first rectifier receiving the input power and outputting a rectified power,
        a first power output configured to output the input power,
        a second power output configured to output the rectified power,
        a pass-through output configured to output the input power, and
        a first circuit breaker configured to provide overcurrent protection before the input power is received by the first rectifier and the first power output; and
    a second power module including
        a second power input receiving the input power, from the pass-through output of the first power module,
        a second rectifier receiving the input power and outputting a second rectified power,
        a third power output configured to output the input power,
        a fourth power output configured to output the second rectified power, and
        a second circuit breaker configured to provide overcurrent protection before the input power is received by the second rectifier and the third power output and provide overcurrent protection after the input power is output from the pass-through output.

2. The power distribution system of claim 1, wherein the input power is approximately 120 volts alternating-current power and the rectified power is approximately 5 volts direct-current power.

3. The power distribution system of claim 1, wherein the second power output is a Universal Serial Bus (USB) power output.

4. The power distribution system of claim 1, wherein the first power module further includes a fifth power output.

5. The power distribution system of claim 4, wherein the fifth power output is configured to output a transformed alternating-current power.

6. The power distribution system of claim 5, wherein the transformed alternating-current power is approximately 220 volts alternating-current.

7. The power distribution system of claim 1, wherein the first power module further includes a transformer configured to convert the input power to a transformed power.

8. The power distribution system of claim 7, wherein the transformer is a step up and step down transformer.

9. A method of distributing power, the method comprising:
    receiving, via a first power input, an input power;
    rectifying, via a first rectifier, the input power into a rectified power;
    outputting, via a first power output, the input power;
    outputting, via a second power output, the rectified power;
    outputting, via a pass-through output, the input power;
    providing, via a first circuit breaker within a first housing of a first power module, overcurrent protection before the input power is received by the first rectifier and the first power output;
    receiving, via a second power input, the input power from the pass-through output;
    rectifying, via a second rectifier, the input power from the second power input into a second rectified power;
    outputting, via a third power output, the input power from the second power input;
    outputting, via a fourth power output, the second rectified power from the second rectifier; and
    providing, via a second circuit breaker within a second housing of a second power module, overcurrent protection before the input power is received by the second rectifier and the third power output and provide over-current protection after the input power is output from the pass-through output.

10. The method of claim 9, wherein the input power is approximately 120 volts alternating-current power and the rectified power is approximately 5 volts direct-current power.

11. The method of claim 9, wherein the second power output is a Universal Serial Bus (USB) power output.

12. The method of claim 9, further comprising outputting a transformed alternating-current power via a fifth power output.

13. The method of claim 12, wherein the fifth power output is included in the first power module.

14. The method of claim 13, wherein the transformed alternating-current power is approximately 220 volts alternating-current.

15. The method of claim 1, further comprising converting, via a transformer, the input power to a transformed power.

16. The method of claim 15, wherein the transformer is a step up and step down transformer.

* * * * *